United States Patent [19]

Babin

[11] Patent Number: 5,591,465

[45] Date of Patent: Jan. 7, 1997

[54] SIDE GATED INJECTION MOLDING APPARATUS WITH RADIALLY MOUNTED GATE INSERTS

[75] Inventor: Denis L. Babin, Acton, Canada

[73] Assignee: Mold-Masters Limited, Georgetown, Canada

[21] Appl. No.: 463,921

[22] Filed: Jun. 5, 1995

[30] Foreign Application Priority Data

May 15, 1995 [CA] Canada ................................. 2149385

[51] Int. Cl.⁶ ................................................ B29C 45/20
[52] U.S. Cl. ................... 425/549; 264/297.2; 264/328.8; 264/328.15; 425/572
[58] Field of Search ..................... 425/549, 572; 264/297.2, 328.8, 328.15

[56] References Cited

U.S. PATENT DOCUMENTS 4,344,750  8/1982  Gellert ..................... 425/549
4,981,431  1/1991  Schmidt .................... 425/549

Primary Examiner—Tim Heitbrink
Attorney, Agent, or Firm—Dalesman & Company

[57] ABSTRACT

Injection molding apparatus for side gating to several cavities spaced around a central heated nozzle extending through an opening in the mold. Several side gate seals are seated in a front portion of the nozzle, each in alignment between one of several radial portions of a melt channel through the nozzle and a gate leading to one of the cavities. The side gate seals each have an outer end which extends a sufficient distance outwardly past the inner surface of the opening in the mold to provide room for cooling conduits extending between the cavities and the central opening. The side gate seals are mounted after the nozzle is sealed in the opening in the mold. A gate insert is then mounted radially into position over the outer end of each side gate seal. A gate insert retainer plate secures the gate inserts in place.

3 Claims, 3 Drawing Sheets

SIDE GATED INJECTION MOLDING APPARATUS WITH RADIALLY MOUNTED GATE INSERTS

BACKGROUND OF THE INVENTION

This invention relates generally to injection molding and more particularly to apparatus for side gating from a heated nozzle through side gate seals to surrounding cavities, each extending partially in a radially mounted gate insert.

Edge gating from a central nozzle seated in an opening in a mold through several hollow seals to surrounding spaced cavities is well known. However, previously the seals were first mounted on the nozzle and the nozzle was then inserted into place in the opening in the mold. Thus, as seen in U.S. Pat. Nos. 4,344,750 to Gellert which issued Aug. 17, 1982 and 4,981,431 to Schmidt which issued Jan. 1, 1991, these previous arrangements have the disadvantage that the outer ends of the seals cannot extend outwardly past the inner surface of the opening in the mold. Consequently, the cavities must be located very close to the nozzle. While this is suitable for some cavities, it is not satisfactory for applications where space for cooling conduits are required between the heated nozzle and the surrounding cavities.

SUMMARY OF THE INVENTION

Accordingly, it is an object of the present invention to at least partially overcome the disadvantages of the prior art by providing injection molding apparatus having gate inserts, each of which mount radially to receive the outwardly projecting end of a side gate seal mounted on the nozzle after insertion into the opening in the mold.

To this end, in one of its aspects, the invention provides side gated injection molding apparatus having at least one heated nozzle seated in a mold, the at least one heated nozzle having a rear end, a front portion with a front end and a generally cylindrical outer surface extending through a central opening in the mold, the central opening in the mold having a generally cylindrical inner surface with an insulative air space provided between the outer surface of the front portion of the at least one heated nozzle and the inner surface of the central opening in the mold, the at least one heated nozzle having a melt channel extending therein to convey melt to fill a plurality of cavities spaced in the mold around the central opening, the melt channel having a central portion extending from the rear end of the at least one heated nozzle and a plurality of radial portions branching outwardly from the central portion adjacent the front end of the front portion of the at least one heated nozzle, each radial portion of the melt channel extending in alignment with a respective gate extending in the mold to one of the cavities, a plurality of spaced side gate seals, each having an inner end, an outer end, and a bore therebetween, the inner end being seated in the front portion of the at least one heated nozzle with the side gate seal extending outwardly across the insulative air space in alignment between a respective radial portion of the melt channel and a respective gate to convey melt outwardly from the melt passage to the gate to fill the cavity, having the improvement wherein each cavity extends partially in a cavity insert mounted in the mold outwardly adjacent the central opening in the mold and partially in a gate insert mounted forwardly against the cavity insert, each side gate seal has an outer end extending a sufficient distance outwardly past the inner surface of the central opening to provide room for cooling conduits extending between the cavities and the central opening, each gate insert has a radial opening extending to the respective gate therein, each gate insert being radially mountable in and radially removable from a position wherein the outer end of a respective side gate seal extends into the radial opening in the inner surface in alignment with the gate therein.

Further objects and advantages of the invention will appear from the following description taken together with the accompanying drawings.

DETAILED DESCRIPTION OF THE INVENTION

Figure 1:
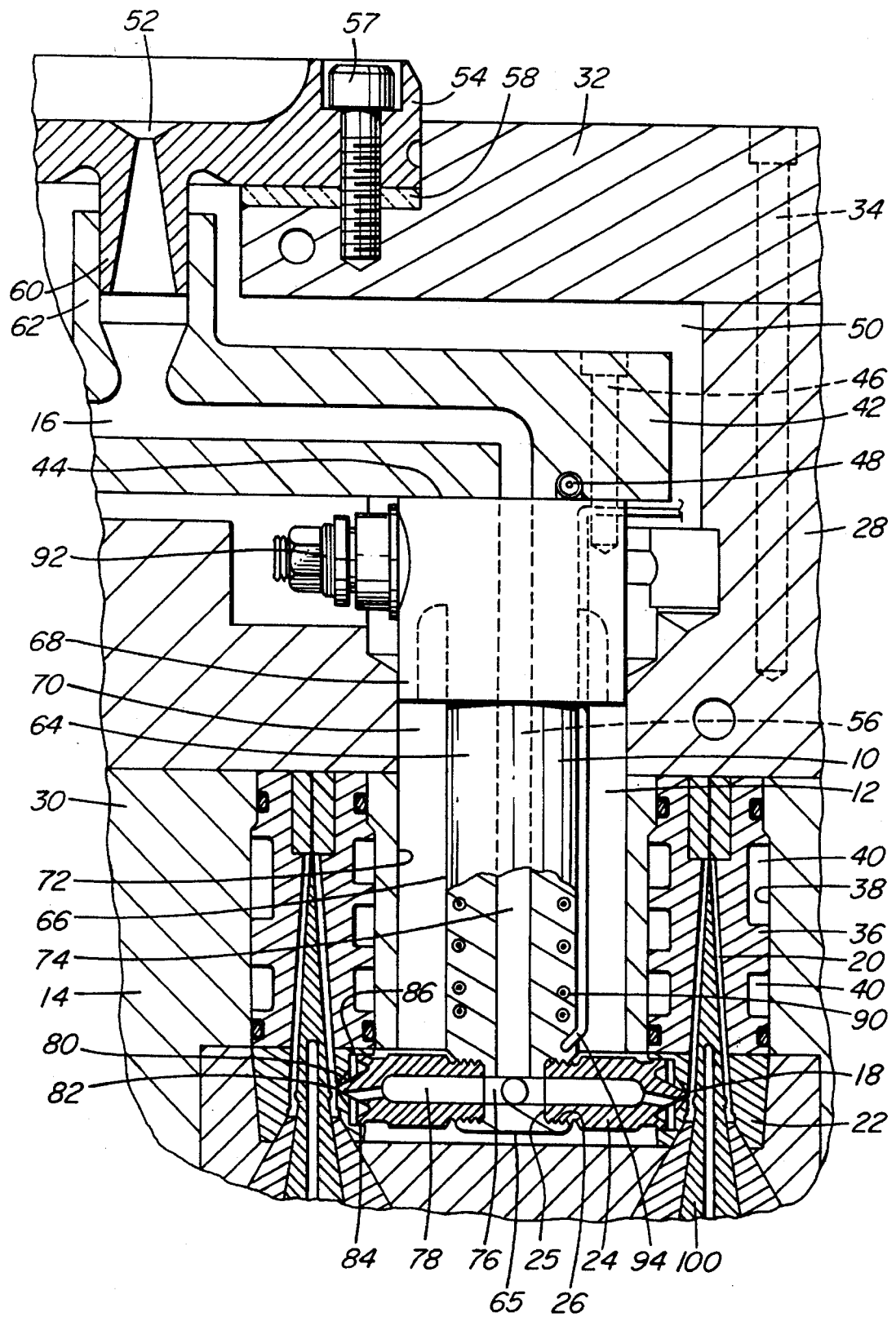
FIG. 1 is a sectional view of a portion of a side gated injection molding system according to one embodiment of the invention.

Reference is first made to FIG. 1 which shows a portion of a side gated multi-cavity injection molding system or apparatus in which several steel nozzles 10 are mounted in cylindrical openings 12 in a mold 14 to convey pressurized melt through a melt passage 16 to gates 18 leading to cavities 20 in the mold 14. Several elongated cavities 20 are spaced around each nozzle 10 and each gate 18 extends through a gate insert 22 aligned with a side gate seal 24 having a threaded inner end 25 screwed into a threaded seat 26 in the nozzle 10.

While molds can have a wide variety of configurations, in this case a spacer plate 28 is mounted between a cavity plate 30 and a back plate 32 which are secured together by screws 34 and other screws (not shown) in a conventional manner. The spacer plate 28 and cavity plate 30 are precisely aligned by dowel pins (not shown). In this arrangement, each elongated cavity 20 extends partially in the gate insert 22 and partially in a cavity insert 36 against which the gate insert 22 is securely mounted. A number of the cavity inserts 36 are spaced around each nozzle 10 in holes 38 in the cavity plate 30. Cooling water is pumped through cooling conduits 40 extending around each cavity insert 36 to provide cooling between the heated nozzle 10 and the cavities 20.

The nozzles 10 are interconnected by a steel melt distribution manifold 42 which extends between the spacer plate 28 and the back plate 32 and is secured against the rear ends 44 of the nozzles 10 by screws 46. The melt distribution manifold 42 is heated by an integral electrical heating element 48 and an insulative air space 50 is provided between it and the surrounding cooled spacer plate 28 and back plate 32. The melt passage 16 receives melt from a molding machine (not shown) through a central inlet 52 in a locating ring 54 seated in the back plate 32 and branches out in the manifold 42 to pass through a melt channel 56 in each of the nozzles 10. The locating ring 54 is secured in place by screws 57 which extend through an insulation ring 58 formed of suitable glass-epoxy material into the back plate 32. The locating ring 54 has a nozzle stem 60 projecting into a cylindrical inlet portion 62 of the manifold 42 to allow for movement of the manifold 42 and the screw mounted nozzles 10 during installation and to provide for thermal expansion and contraction as described below.

Each nozzle 10 has a front portion 64 with a front end 65 and a generally cylindrical outer surface 66. The nozzle 10 has an insulation and location flange portion 68 which fits in the cylindrical opening 12 in the spacer plate 28. This accurately locates the front portion 64 of the nozzle 10 centrally between the cavities 20 and provides an insulative air space 70 between the outer surface 66 of the front portion 64 of the nozzle 10 and the surrounding cylindrical inner surface 72 of the central opening 12. The melt channel 56 in the nozzle 10 has a central portion 74 extending from the rear end 44 to a number of radial portions 76 which branch outwardly adjacent the front end 65 of the front portion 64. Each radial portion 76 extends to a bore 78 in the side gate seal 24 which is aligned between the radial portion 76 of the melt channel 56 and the gate 18 in the gate insert 22 leading to the cavities 20. Each side gate seal 24 has an outer end 80 which extends outwardly past the inner surface 72 of the central opening 12 a sufficient distance to provide room for the cooling conduits 40 extending between the nozzle 10 and the cavity 20. While various configurations are suitable for different applications, in this embodiment, the outer end 80 has a pointed tip 82 in alignment with the gate 18 and an outer circumferential rim 84 seated in a radial opening 86 in the gate insert 22. The nozzle 10 is heated by an integral electrical heating element 90 which extends around the central portion 74 of the melt channel and has an external terminal 92. A thermocouple element 94 extends into the nozzle 10 near the front end 65 to monitor the operating temperature.

Figure 2:
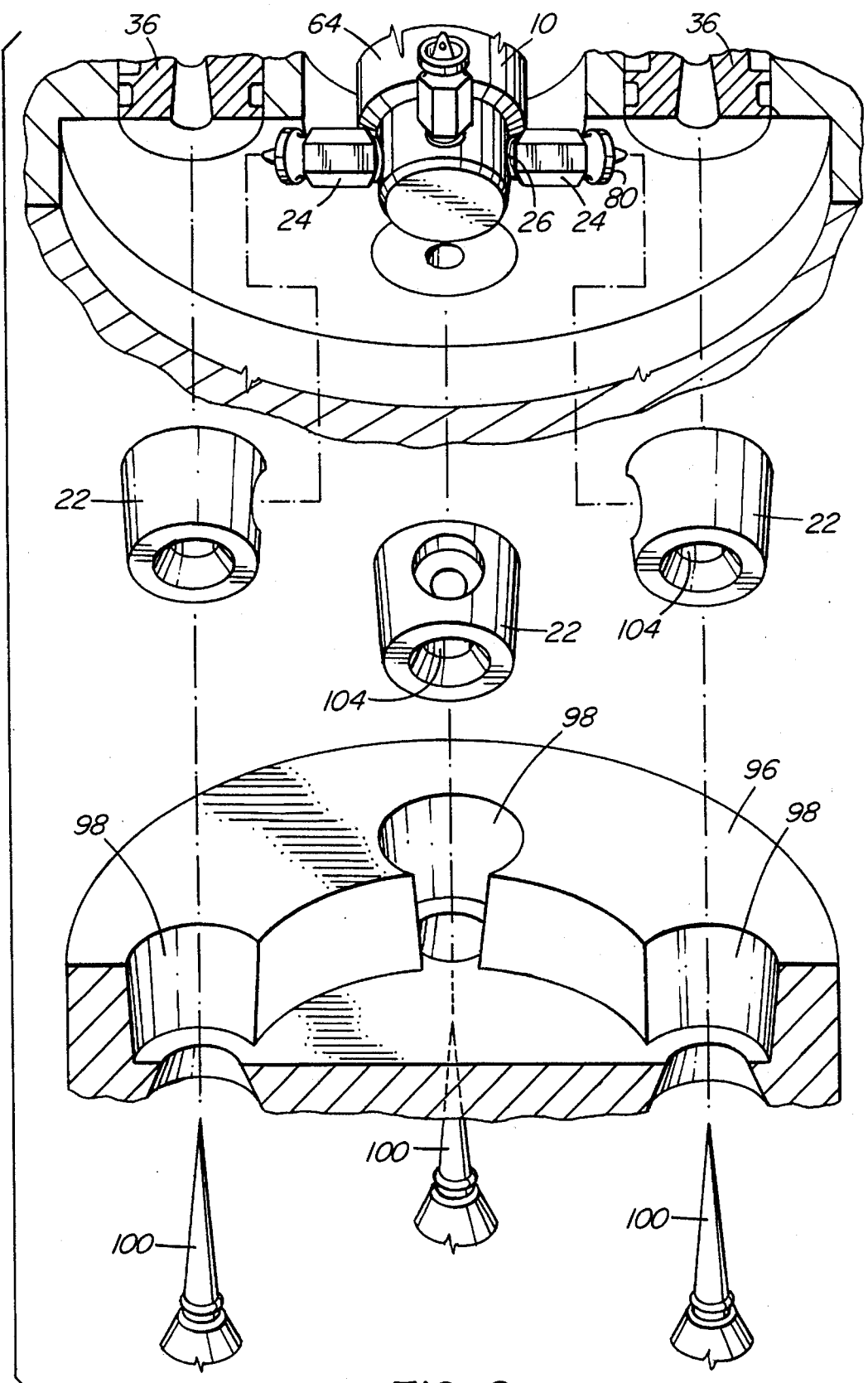
FIG. 2 is an isometric view of the same apparatus showing how it is assembled.

During assembly the nozzles 10 are each attached to the manifold 42 by the screws 46. As seen in FIG. 2, each nozzle 10 is mounted with its front portion 64 projecting through the opening 12 in the mold 14. The nozzles 10 and attached manifold 42 are advanced forwardly to provide room for the side gate seals 24 to be easily screwed into place in the threaded seats 26. The manifold 42 and nozzles 10 are then retracted to the position shown in FIG. 1 and a gate insert 22 is mounted in place on each side gate seal 24 by inserting it upwardly and then sliding it radially inward over the outer end 80 of the seal 24. A gate insert retainer plate 96 is then secured in place by screws (not shown). As can be seen, the gate insert retainer plate 96 has recesses 98 therein in which the gate inserts 22 are received. This holds the gate inserts 22 in place which in turn locate the nozzles 10 in the retracted position. The recesses 98 in the gate insert retainer plate 96 and the inserts 22 are tapered to provide for easy assembly and ensure a tight fit. Finally, the cavity cores 100 with central cooling conduits 102 are secured in place extending through a hole 104 in each gate insert 22 into the adjacent cavity insert 36. Of course, the nozzle 10 and side gate seals 24 are removable for cleaning or replacement by reversing this procedure. Thus, as can be seen, utilization of the radially mountable gate inserts 22 makes it feasible to use the side gate seals 24 which are mounted on the nozzle 10 after it is inserted through the opening 12 because they are too large to fit through the opening 12 if mounted beforehand. The extra length of the side gate seals 24 give sufficient room to provide the cooling conduits 40 between the heated nozzle 10 and the cavities 20 which are necessary for this application.

In use, after installation in the mold 14 as seen in FIGS. 1 and 2, electrical power is applied to the heating element 48 in the manifold 42 and to the heating elements 90 in the nozzles 10 to heat them to a predetermined operating temperature. The nozzles 10 are located by the circumferential rims 84 of the side gate seals 24 being seated in the radial openings 86 in the gate inserts 22. When the system is heated up, thermal expansion of the nozzles 10 causes the floating manifold 42 to move slightly rearwardly. This movement is accommodated by the nozzle stem 60 of the locating ring 54 sliding inside the cylindrical inlet portion 62 of the manifold 42 and by the insulation and location flange portion 68 of each nozzle 10 sliding in the opening 12 in the spacer plate 28. While a system having a number of nozzles 10 is shown, in other embodiments having only a single nozzle no melt distribution manifold is required and the rear end of the nozzle retracts and advances slightly to provide for thermal expansion and contraction. Pressurized melt is applied from a molding machine (not shown) to the central inlet 52 of the melt passage 16 according to a predetermined cycle. The melt flows through the melt distribution manifold 42, nozzles 10, side gate seals 24, and gates 18 into the cavities 20. After the cavities 20 are filled and a suitable packing and cooling period has expired, the injection pressure is released and the melt conveying system is decompressed to avoid stringing through the open gates 18. The mold 14 is then opened to eject the molded products. After ejection, the mold 14 is closed and the cycle is repeated continuously with a cycle time dependent upon the size of the cavities 20 and the type of material being molded.

Figure 3:
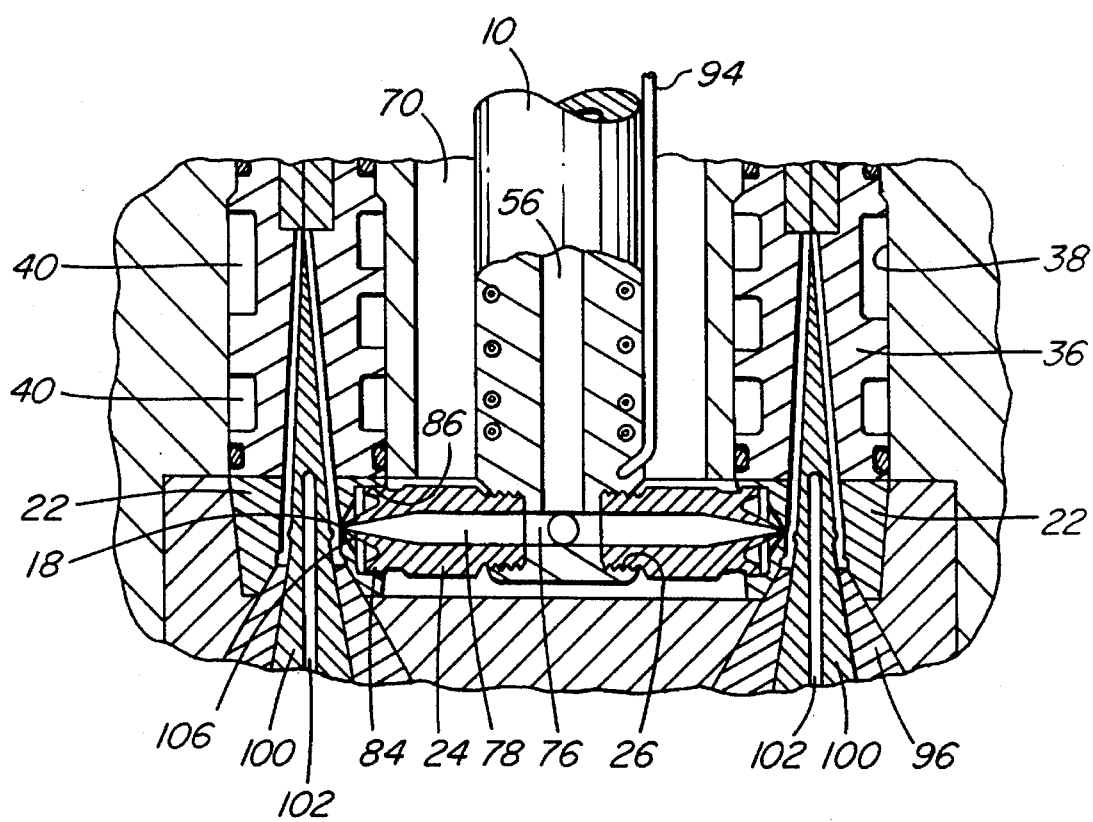
FIG. 3 is a sectional view showing another type of side gate seal.

FIG. 3 illustrates that the side gate seals 24 can have other configurations as well. In this case, the bore 78 in each seal 24 aligned with the respective radial portion 76 of the melt channel 56 extends outwardly through a tapered nose portion 106 in alignment with the gate 18. This gate configuration is used rather than the hot tip gate shown in FIGS. 1 and 2 when less precise temperature control is required in the gate area.

While the description of the side gated apparatus has been given with respect to preferred embodiments, it will be evident that various other modifications are possible without departing from the scope of the invention as understood by those skilled in the art and as defined in the following claims.

The embodiments of the invention in which an exclusive property or privilege is claimed is defined as follows:

1. In a side gated injection molding apparatus having at least one heated nozzle located in a mold, the at least one heated nozzle having a rear end, a front portion with a front end and a generally cylindrical outer surface extending through a central opening in the mold, the central opening in the mold having a generally cylindrical inner surface with an insulative air space provided between the outer surface of the front portion of the at least one heated nozzle and the inner surface of the central opening in the mold, the at least one heated nozzle having a melt channel extending therethrough to convey melt to fill a plurality of cavities spaced in the mold around the central opening, the melt channel having a central portion extending from the rear end of the at least one heated nozzle and a plurality of radial portions branching outwardly from the central portion adjacent the front end of the front portion of the at least one heated nozzle, each radial portion of the melt channel extending in alignment with a respective gate extending in the mold to one of the cavities, a plurality of spaced side gate seals, each having an inner end, an outer end, and a bore therebetween, the inner end being seated in the front portion of the at least one heated nozzle with the side gate seal extending outwardly across the insulative air space in alignment between a respective radial portion of the melt channel and a respective gate to convey melt outwardly from the melt passage to the gate to fill the cavity, the improvement wherein;

each cavity extends partially in a cavity insert mounted in the mold outwardly adjacent the central opening in the mold and partially in a gate insert mounted forwardly against the cavity insert, each side gate seal has an outer end extending a sufficient distance outwardly past the inner surface of the central opening to provide room for cooling conduits extending between the cavities and the central opening, each gate insert has a radial opening extending to the respective gate therein, each gate insert being radially mountable in and radially removable from a position wherein the outer end of a respective side gate seal extends into the radial opening in the inner surface in alignment with the gate therein.

2. Side gated injection molding apparatus as claimed in claim 1 further comprising a gate insert retainer plate mountable over the gate inserts to secure the gate inserts in place.

3. Side gated injection molding apparatus as claimed in claim 2 wherein the outer end of each side gate seal has a pointed tip in alignment with a respective gate.

* * * * *